Figure 8:
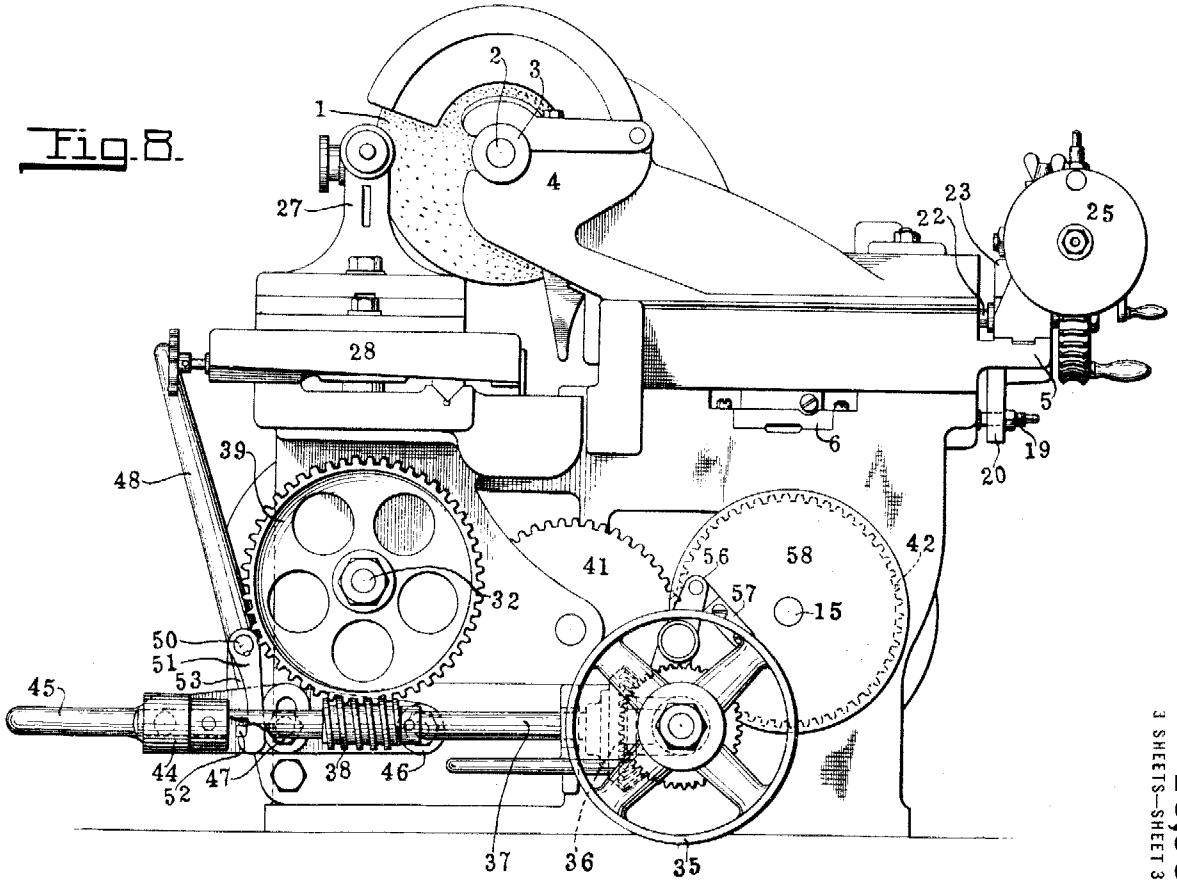

F. MULLER.
GRINDING MACHINE.
APPLICATION FILED JUNE 17, 1913.
Reissued June 15, 1915.
13,930.
3 SHEETS—SHEET 1.
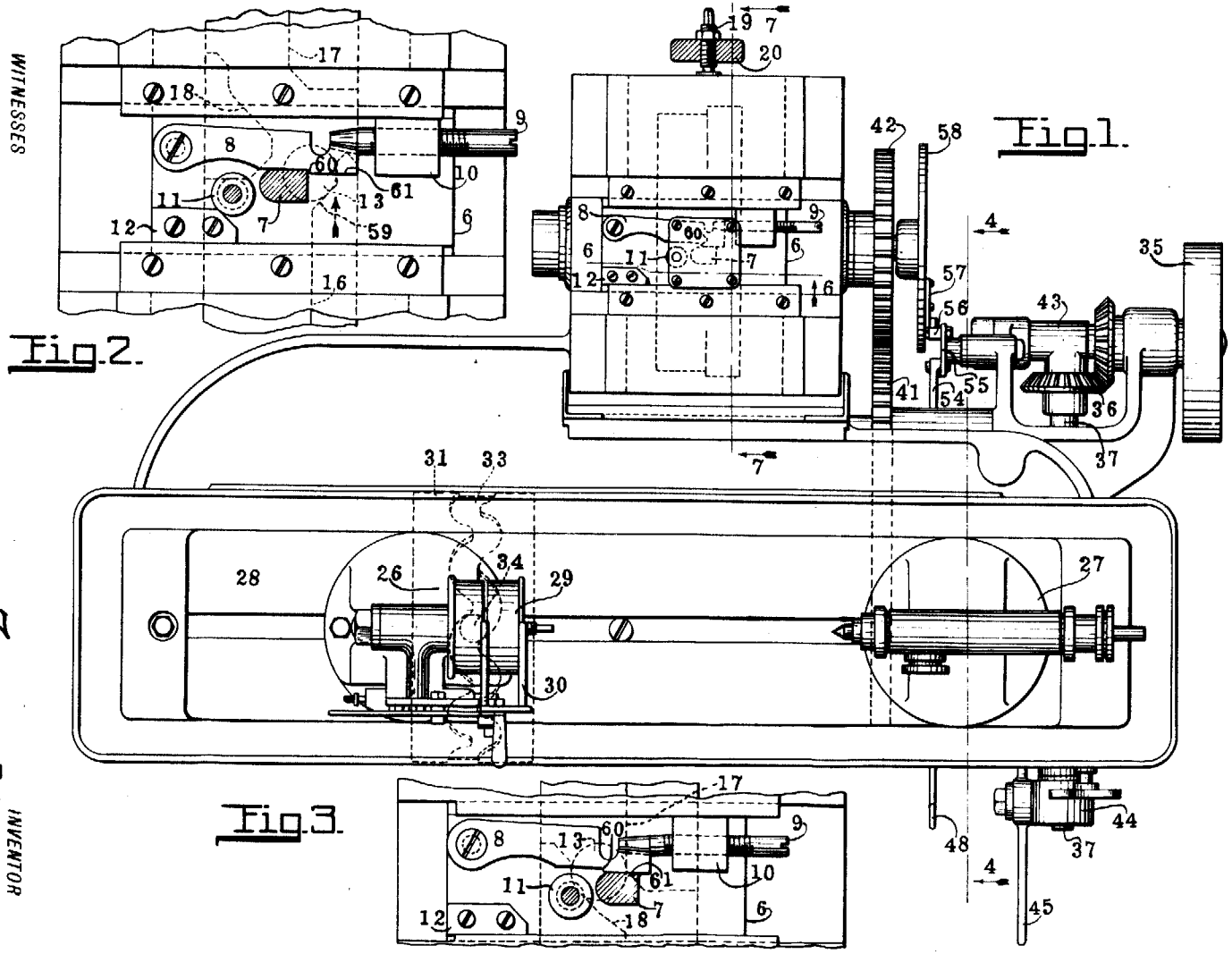
WITNESSES
C. F. Volk
Delos G. Haynes
INVENTOR
Friedrich Müller
BY
Duell, Warfield & Duell
ATTORNEYS F. MÜLLER.
GRINDING MACHINE.
APPLICATION FILED JUNE 17, 1913.
Reissued June 15, 1915.
13,930.
3 SHEETS—SHEET 2.
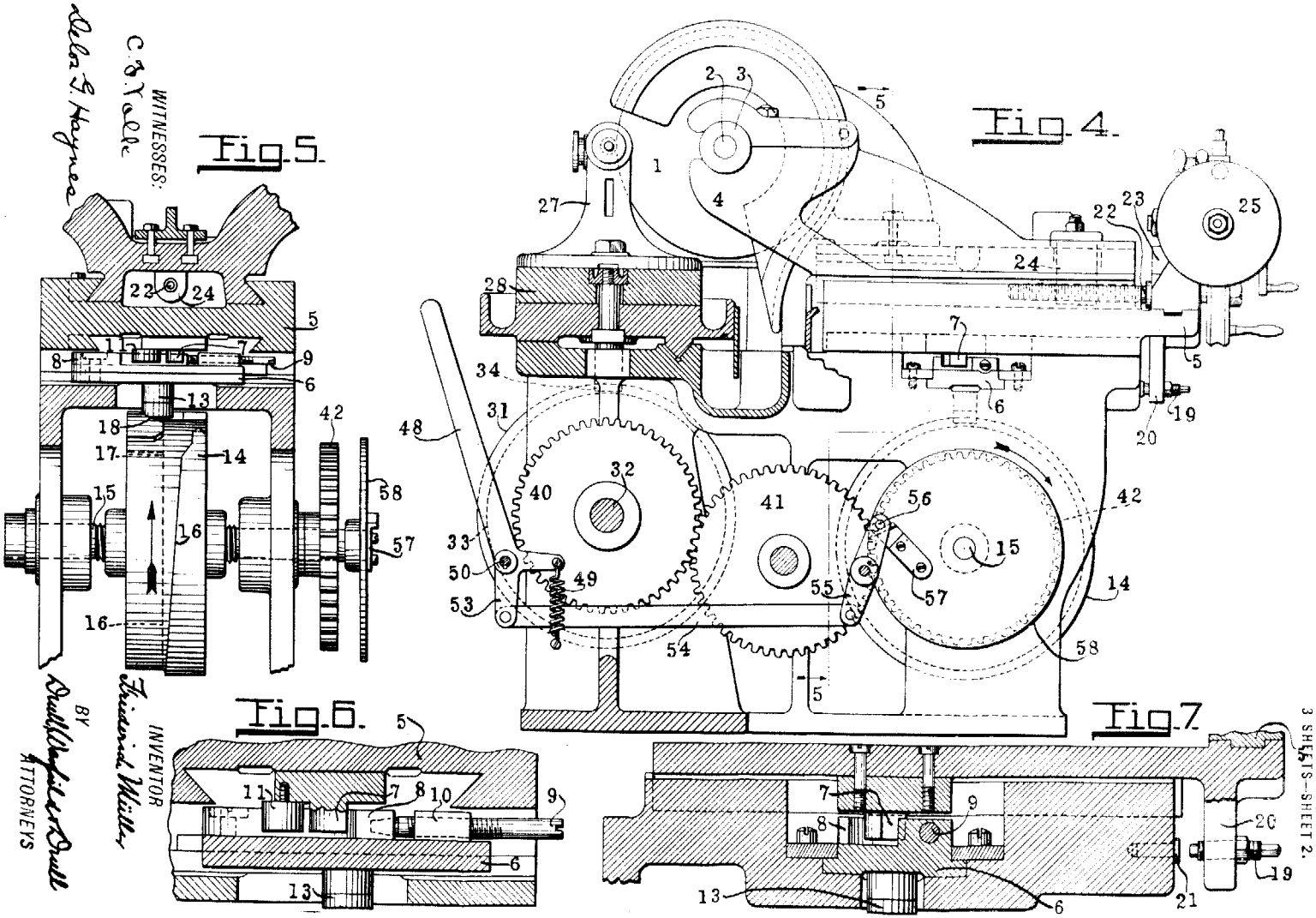
WITNESSES:
C. J. Volk
Delos G. Haynes
INVENTOR
Friederich Müller
BY
Duell, Mayfield & Duell
ATTORNEYS

F. MÜLLER.

GRINDING MACHINE.

APPLICATION FILED JUNE 17, 1913.

Reissued June 15, 1915.

13,930.

3 SHEETS—SHEET 3.

WITNESSES

C. F. Volk

Delos G. Haynes

INVENTOR

Friederich Müller

BY

Duell, Warfield & Duell

ATTORNEYS

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

GRINDING-MACHINE.

13,930. Specification of Reissued Letters Patent. Reissued June 15, 1915.

Original No. 1,055,286, dated March 4, 1913, Serial No. 627,078. Application for reissue filed June 17, 1913. Serial No. 774,268.

*To all whom it may concern:*

Be it known that I, FRIEDERICH MÜLLER, a citizen of the United States, and a resident of Hartford, county of Hartford, and State of Connecticut, have invented certain new and useful Improvements in Grinding-Machines, of which the following is a specification.

The invention relates to grinding machines and in certain of its features more especially to machines in which work is automatically ground to a dimension within very exact limits, although in other of its features the invention may be applicable to grinding machines generally.

Objects of the invention are to provide a machine which will automatically grind the work to dimension within very exact limits without requiring constant care and attention from a skilled attendant; to provide a machine which will automatically separate the work and the wheel when the work has been ground to dimensions; to provide a machine which, in addition to the grinding action proper, will automatically give an additional finishing of polishing action; to provide a machine which will give a variety of relative movements between the wheel and work and which provides for various combinations and variations of such movements for different purposes and kinds of work; to provide a machine which is capable of nice and accurate movement of parts; to provide for accurate and exact adjustment and variation of such movements; to provide for accurate grinding of the work and to provide for the elimination of inaccuracy due to spring or play that may occur in the parts of the machine or of the work; to provide a machine embodying these features, together with others, which shall require a minimum of attention.

Of the drawings: Figure 1 is a plan view, with parts removed, of a machine constructed in accordance with the principles of the invention; Figs. 2 and 3 are details showing parts of the mechanism for controlling the wheel supporting carriage in different positions; Fig. 4 is an elevation, partly in section, on the line 4—4 of Fig. 1; Fig. 5 is a sectional elevation on the line 5—5 of Fig. 4; Fig. 6 is a fragmentary sectional view substantially on the line 6—6 of Fig. 1; Fig. 7 is a fragmentary sectional view substantially on the line 7—7 of Fig. 1; and Fig. 8 is a right-hand end elevation, referring to Fig. 1 of the drawings.

In the machine illustrated as an embodiment of the invention in the accompanying drawings, means are shown for supporting the work and means for supporting a grinding wheel, and also means for causing a relative approaching movement between the wheel and the work. This movement may be for the purpose of bringing the wheel and the work into operative relation, or for keeping them in operative relation as the work is ground away by the wheel, or it may be for a combination of the two, as shown in the illustrated embodiment, the approaching movement comprises what may be termed two relative movements, one of the movements being a positioning movement to bring the work and the wheel into operative relation with each other after the work has been inserted in its support and the other a feeding movement to keep them in operative relation as the work is ground away by the wheel. In so far as concerns the invention, it is immaterial how the said relative approaching movement is effected, whether by combined movement of the wheel and the work, or by movement of the wheel toward the work, or of the work toward the wheel; but as shown, the wheel moves toward the work in said movement. In the said illustrated means for effecting the functions indicated, are provided, the illustrated form of said means including a grinding wheel 1 mounted for rotation in any suitable or convenient manner, as upon a shaft 2 carried in bushings 3 upon a support 4. Any suitable means for rotating the grinding wheel may be provided. The support 4 is shown herein mounted upon a carriage 5, which is movable upon the frame of the machine for effecting the relative approaching movement between the wheel and the work, sliding upon suitable guides carried upon the machine frame.

The invention comprises, according to certain of its features, means for limiting the approaching relative movement of the work and the wheel; automatic means for causing a relative separating movement between the work and the wheel; and means for causing said separating means to operate at a definite period after the approaching movement has ceased or has been limited. The forms of such means here shown (see Figs. 2, 3, 6 and 7) comprise an auxiliary carriage 6 having movement in a direction transverse to that of the carriage 5. The said supports are so constructed and arranged that as the carriage 6 is moved transversely in one direction or the other a suitable movement is imparted to the carriage 5 and to the grinding wheel 1 supported thereon. The said carriages are constructed and arranged so that one receives movement from the other. As illustrated, a lug 7 is connected rigidly to the carriage 5 and has sliding contact with a cam piece 8 upon the carriage 6. The face of the member 8 in contact with the lug 7 is so shaped that for a given motion of the carriage 6 a desired motion will be imparted to the carriage 5.

For the purpose of varying the relative position and movement of the two carriages the member 8 is shown as being pivotally mounted and as having suitable adjusting means coacting therewith. The form of said adjusting means herein shown comprises a screw 9 threaded into a block 10 upon the carriage 6, the tapered end of the screw bearing upon a suitably shaped surface of the cam 8. It will be seen that as the screw is turned backward and forward the position of the cam faces upon the member 8 will be varied relatively to the carriage 6 upon which the member 8 is carried. Carried also upon the carriage 5 is a second engaging device, shown herein as an anti-friction roll 11. A second cam piece 12 is shown fixed upon the carriage 6. The anti-friction roll 11 and the cam piece 12 contact with each other at certain times in order to control the movement of the carriage 5 with respect to the carriage 6, as will hereinafter be more fully set forth.

The carriage 6 is provided with a suitable member for engaging suitable actuating means, said actuating means serving to move and control the carriage 6 and thereby the carriage 5 and the grinding wheel 1. As herein shown said engaging member comprises an anti-friction roll 13, which is shown in engagement with a cam 14, mounted for rotation upon a shaft 15, and carrying cam surfaces 16, 17 and 18, (shown in dotted lines in Figs. 2 and 3 and in Fig. 5), suitably shaped to impart movement to the carriage 6, the operation of these will be hereinafter more fully set forth. The cam member 14 is herein shown as being adjustable upon the shaft 15, thus serving to adjust the position of the carriage 6. The illustrated form of such adjustment comprises a screw thread upon the shaft 15 upon which the member 14 is threaded and lock nuts for holding the cam 14 in its adjusted position. The portion of the approaching movement utilized for keeping the work and wheel in operative relation as the wheel grinds away the work, or what may be termed the "feeding" movement, may be continuous, if desired, or it may consist of a succession of intermittent movements. Such variations in the movement can be effected by suitable changes in the contours of the cams.

In addition to the means already described for controlling the wheel 1, I provide an adjustable stop upon the carriage 5 for positively limiting the approaching movement; see Figs. 1, 4, 7 and 8. The said adjustable stop comprises a member 19 threaded in a lug 20 fixed to the carriage 5, one face of the member 19 being adapted to contact with a suitable face 21 carried upon the frame of the machine. This additional limiting means acts when there is any spring or play in the connected parts between the wheel and the devices for controlling its movement or in the work. Suitable means are provided for giving an adjustment of the support 4 for the grinding wheel 1 with respect to its carriage 5; as herein shown this comprises a rotatable screw-threaded rod 22, rotating in a block 23 upon the carriage 5, and threaded into a lug 24 upon the support 4. Suitable means for giving a slow rotation to the screw 22 is provided, such as the micrometer head 25.

A relative advancing movement tangential to the wheel is provided to cause the wheel to operate progressively on different parts of the work. I have shown this as rotary, although it might be a rectilinear or other movement. In the illustrated form of means the said relative movement is obtained by the movement of the work, suitable means being provided for rotating the work as well as the grinding wheel. This comprises a head stock 26 and tail stock 27, provided with suitable centers and holding devices, mounted upon a bed 28. Suitable driving devices are shown in connection with the head stock, such as a fast and loose pulley 29 and a belt shifter 30, as shown in Fig. 1.

A relative transverse movement between the wheel and the work is employed. This is a vibrating movement in a direction substantially parallel to the line of contact between the wheel and the work. It is immaterial whether the said movement is effected by moving the work, or moving the grinding wheel, or both; in the present embodiment it is obtained by movement of the work. As shown herein, the bed 28 slides longitudinally upon the frame of the machine (see particularly Figs. 4 and 8 of the drawings). Located adjacent to the said bed is a cam 31 shown herein as of rotary form and mounted upon a suitable shaft 32. The member 31 has in its periphery a cam groove 33 which coacts with the anti-friction roll 34, carried by the bed 28. It will be seen therefore that the bed 28 may have a to-and-fro longitudinal movement in the present embodiment as the work is rotated in contact with the rotating grinding wheel. The said vibrating movement may serve to feed different portions of the work into position to be operated upon by the grinding wheel, where the work is longer than the width of the grinding wheel. Where the surface of the wheel is in operative relation with the entire length of the work, a movement of this kind is useful in causing a more uniform action of the grinding wheel by nullifying the effects of hard spots or other slight imperfections in the grinding surface of the wheel and conduces also to an even wearing of the wheel.

In the last-mentioned condition and, preferably, the extent or amplitude of the vibrating movement is such that the grinding wheel remains in contact with the work from the beginning to the end of the grinding operation, which is conducive to accuracy and uniformity of results. In the illustrated embodiment the extent of vibrating movement is predetermined by the shape of the cam groove 33 and is not dependent upon the length of the surface to be ground, which, as indicated by the distance between the head and tail stocks 26 and 27, shown in Fig. 1, may be much greater than the amplitude of the vibratory movement. The length of surface being ground at a given time, when greater than the width of the wheel, is determined by that width in addition to the extent of the vibration; though it will be understood that the extent of movement may be varied, as also its rate, by suitable changes.

Suitable driving means and controlling means are provided and the form thereof shown in the drawings comprises a belt pulley 35 connected by a miter gearing 36 to a shaft 37; see Figs. 1, 4 and 8. Upon the said shaft is a worm 38 in mesh with a worm wheel 39 upon the shaft 32. Gear 40 upon the other end of the shaft 32 (see Fig. 4) meshes with a suitable intermediate 41 which in turn meshes with a gear 42 upon the shaft 15. In the present embodiment one end of the shaft 37 is journaled in a lug upon the sleeve 43 upon the main shaft of the machine (see Fig. 1) adapted to rotate upon its support, and the other end in a bearing 44 pivotally mounted upon a lever 45 which is in turn pivotally mounted at 46 upon the machine frame. By this construction the shaft 37 may, by the action of the lever 45, be dropped at one end so that the worm which it carries falls out of mesh with the gear. A suitable pin-and-slot connection 47 is provided for limiting the movement of the lever 45. Fixed upon a shaft 50 (see Fig. 4) suitably mounted on the frame of the machine is a lever 48 pulled by a spring 49. Fixed also upon the shaft 50 is a hook 51, see Fig. 8, which is adapted to engage with a lug 52 upon the lever 45. An arm 53, see Fig. 4, fixed to the lever 48 is connected by a link 54 to a lever 55 having at its free end a friction roll 56 located in the path of the lug 57 upon the disk 58 carried upon the shaft 15.

The operation of the herein-described machine is substantially as follows: The pulley 35 being operated by a suitable driving device, a piece of work is placed in position in the work support and rotation imparted thereto through the driving pulleys 29 upon the head block. At this time the hook 51 is out of engagement with the lug 52 and the lever 45 is at its lowermost position, carrying the worm 38 out of engagement with its wheel 39. The operator lifts the lever 45 and the hook 51 yielding against the spring 49 snaps into position beneath the lug 52. The worm 38 is then in mesh with the wheel 39. The shafts 32 and 15 are thus caused to rotate. The rotation of the shaft 32 through the cam 33 imparts a transverse or vibrating movement to the bed 28 and to the work supported thereon.

The carriage 5 and auxiliary carriage 6 may be regarded as being substantially in the position shown in Fig. 2. The roll 13 by the rotation of the shaft 15 rides along the first steep portion 59 of its cam 14, moving the carriage 6 quickly to the left, as seen in Fig. 2. The lug 7 also rides up the first steep incline 60 upon the cam surface of the member 8, thus giving the carriage 5, the grinding wheel 1, and the connected parts a relatively quick idle movement toward the work. The anti-friction roll 13 is now in contact with the gentle inclined cam surface 16 on the member 14 and slowly but positively or unyieldingly moves the carriage 6 toward the left, referring again to Fig. 2. During substantially all this time the lug 7 is in contact with the next inclined face 61 of the cam piece 8 (see Fig. 3), which has usually a very small degree of inclination and is slowly and positively moving or "feeding" the wheel toward the work to keep the wheel and the work in operative relation as the work is ground away by the wheel, the extent and speed of this movement being predetermined by the shape of the cam surfaces and the adjustment of the screw 9. Referring to Fig. 5 of the drawings, it will be noted that the cam surface 16 extends into the cam surface 17 which is straight and therefore as the member 14 rotates allows the carriage 6 to remain stationary. There is therefore no approaching movement of the carriage 5 and the grinding wheel 1 while the roll 13 is traveling along the surface 17. Substantially at the time the roll 13 reaches the surface 17 the pin 19 engages its stop 21 thus positively limiting the approaching movement of the wheel 1 toward the work. The wheel 1 continues to rotate, however, as does also the work, and thus any spring or unevenness in the surface of the work is ground away and what may be termed a polishing and dimensioning finish is given to the work. The shaft 15 continuing its rotation, the roll 13 now comes in contact with the cam piece 18 and the carriage 6 is then given a relatively quick traverse in the opposite direction. At substantially the same time the roll 11 upon the carriage 5 comes in contact with the cam piece 12 upon the auxiliary carriage 6 and the carriage 5 is moved backwardly carrying the grinding wheel with it from the work. It will thus be seen that the separation of the wheel and work occurs at a definite period after the approaching movement has ceased or has been limited. At about this time the lug 57 upon the disk 58 encounters the roll 56 on the lever 55. Lever 55 is pulled back by link 54, and thus rocks the shaft 50 and causes the hook 51 to leave the lug 52, whereupon the lever 45 drops down and the worm 38 passes out of mesh with its wheel 39. The operator removes the work, inserts new work, and the machine is again ready to operate.

From all the foregoing it will be understood that a machine has been provided which realizes the objects of invention and advantages herein set forth, together with other objects and advantages.

The invention, in its broader aspects, is not limited to the particular constructions shown, nor to any particular constructions by which it has been or may be carried into effect, as many changes may be made in the mechanism without departing from the main principles of the invention and without sacrificing its chief advantages.

What I claim is:

1. In a grinding machine, a grinding wheel, and means for rotating it; supports for the work, and means for rotating it; in combination with means for bringing together the wheel and the work to take a roughing cut; and means for maintaining the two in fixed relative position in at least one plane for a determinate period to take a dimensioning cut, thereby compensating for spring in the machine or the work.

2. Apparatus of the character described, comprising, in combination, a rotatable grinding element, means for supporting and rotating the work, automatic means for causing a relative feeding movement between said element and the work while said element and the work are in contact, automatic means for holding said element at a fixed distance with relation to the axis of rotation of the work for a predetermined period upon the completion of the feeding movement, and automatic means for causing a vibrating movement between said element and the work.

3. Apparatus of the character described, comprising, in combination, a rotatable grinding element, means for supporting and rotating the work, automatic means for causing a relative feeding movement between said element and the work, automatic means for holding said element at a fixed distance with relation to the axis of rotation of the work for a predetermined period upon the completion of the feeding movement, and automatic means for separating said element and the work at a definite period after the feeding movement has ceased.

4. Apparatus of the character described, comprising, in combination, a rotatable grinding element, means for supporting and rotating the work, automatic means for causing a relative feeding movement between said element and the work, automatic means for holding said element at a fixed distance with relation to the axis of rotation of the work for a predetermined period upon the completion of the feeding movement, automatic means for causing a vibrating movement between said element and the work, and automatic means for separating said element and the work at a definite period after the feeding movement has ceased.

5. Apparatus of the character described, comprising, in combination, a rotatable grinding element, means for supporting the work, automatic means for causing a relative positioning movement between said element and the work, automatic means for causing a relative feeding movement between said element and the work, means for limiting such feeding movement, automatic means for causing a vibrating movement between said element and the work, and automatic means for separating said element and the work, said separating means being constructed and arranged to operate at a definite period after the feeding movement has been limited.

6. Apparatus of the character described, comprising, in combination, a rotatable grinding element, means for supporting the work, automatic means for causing a positive and predetermined relative approaching movement between said element and the work, automatic means for causing a relative vibrating movement between said element and the work, and automatic means for separating said element and the work.

7. Apparatus of the character described, comprising, in combination, a rotatable grinding element means for supporting the work, automatic means for causing a relative positioning movement between said element and the work, automatic means for causing a relative feeding movement between said element and the work, automatic means for causing a relative vibrating movement between said element and the work, and automatic means for separating said element and the work, at a definite period after the feeding movement has ceased.

8. Apparatus of the character described, comprising, in combination, a rotatable grinding element, means for supporting the work, automatic means for causing a relative approaching movement between said element and the work, means for positively limiting the approaching movement, automatic means for causing a relative advancing movement between said element and the work, automatic means for causing a relative vibrating movement between said element and the work, and automatic means for separating said element and the work, said separating means being constructed and arranged to operate at a definite period after the approaching movement has been limited.

9. Apparatus of the character described, comprising, in combination, a rotatable grinding element, means for supporting and rotating the work, automatic means for causing a positive and predetermined relative approaching movement between said element and the work, automatic means for causing a vibrating movement between said element and the work, and automatic means for separating said element and the work.

10. Apparatus of the character described, comprising, in combination, a rotatable grinding element, means for supporting and rotating the work, automatic means for causing a relative approaching movement between said element and the work, automatic means for causing a vibrating movement between said element and the work, and automatic means for separating said element and the work, said separating means being constructed and arranged to operate at a definite period after said approaching movement has ceased.

11. Apparatus of the character described, comprising, in combination, a rotatable grinding element, means for supporting and rotating the work, automatic means for causing a relative approaching movement between said element and the work, means for limiting the approaching movement, automatic means for causing a vibrating movement between said element and the work, and automatic means for separating said element and the work.

12. Apparatus of the character described, comprising, in combination, a rotatable grinding element, means for supporting and rotating the work, automatic means for causing a relative approaching movement between said element and the work, means for positively limiting the approaching movement, automatic means for causing a vibrating movement between said element and the work, and automatic means for separating said element and the work, said separating means being constructed and arranged to operate at a definite period after the approaching movement has been limited.

13. Apparatus of the character described, comprising, in combination, a support for a rotatable grinding element, a work support, one of said supports being mounted upon a sliding carriage, a movable cam member constructed and arranged to control the movement of the said carriage, said cam member being pivotally mounted, and means for adjustably positioning the said pivoted cam member.

14. Apparatus of the character described, comprising, in combination, a support for a rotatable grinding element, a work support, one of said supports being mounted upon a sliding carriage, a movable cam member constructed and arranged to control the movement of the said carriage, said cam member being pivotally mounted, and a screw-threaded member for adjustably positioning the said pivoted cam member.

15. Apparatus of the character described, comprising, in combination, a support for a rotatable grinding element, a work support, one of said supports being mounted upon a sliding carriage, a second carriage sliding transversely to the path of the first carriage, connections between the said carriages whereby the movement of the second carriage affects the movement of the first, and means for adjusting the connections between the said carriages so as to vary the movement of the first carriage for a given movement of the second.

16. Apparatus of the character described, comprising, in combination, a support for a rotatable grinding element, a work support, one of said supports being mounted upon a sliding carriage, a second carriage sliding transversely to the path of the first carriage, a cam member upon one of the said carriages constructed and arranged to engage the other carriage, and screw-threaded means for adjusting the position of said cam member so as to vary the movement of one carriage relatively to the other.

17. Apparatus of the character described, comprising, in combination, a support for a rotatable grinding element, a work support, one of said supports being mounted upon a sliding carriage, a second carriage sliding transversely to the path of the first carriage, cam members between the two carriages for controlling the movement in both directions of the first carriage by the movement of the second carriage, and a rotary cam member for giving the second a definite length of stroke.

18. Apparatus of the character described, comprising, in combination, a rotatable grinding element, means for supporting the work, means for causing a relative approaching movement between said element and the work, means for separating said element and the work, driving means for said approaching means and separating means, and automatic means for throwing off the said driving means upon the completion of said separating movement.

19. Apparatus of the character described, comprising, in combination, a support for a rotatable grinding element, a work support, automatic means for causing said supports to approach each other with a relatively rapid positioning movement and then with a relatively slow feeding movement, and means for separating said supports.

20. Apparatus of the character described, comprising, in combination, a support for a rotatable grinding element, a work support, automatic means for causing said supports to approach each other with a relatively rapid positioning movement and then with a relatively slow feeding movement, and automatic means for separating said supports.

21. Apparatus of the character described, comprising, in combination, a support for a rotatable grinding element, a work support, automatic means for causing said supports to approach each other with a relatively rapid positioning movement and then with a relatively slow feeding movement, automatic means for holding said element at a fixed distance with relation to the work to complete the abrasion, and means for separating said supports.

22. Apparatus of the character described, comprising, in combination, a support for a rotatable grinding element, a work support, automatic means for causing said supports to approach each other with a relatively rapid positioning movement and then with a relatively slow feeding movement, means for positively limiting said approaching movement, means for causing a vibrating movement between said element and the work, and automatic means for separating said supports a definite period after said approaching movement has been limited.

23. Apparatus of the character described, comprising, in combination, a support for a rotatable grinding element, a work support, automatic means for causing said supports to approach each other with a relatively rapid positioning movement and then with a relatively slow feeding movement, means for varying the amount of said relatively slow movement, and adjustable means for positively limiting said approaching movement.

24. Apparatus of the character described, comprising, in combination, a support for a rotatable grinding element, a work support, automatic means for causing said supports to approach each other with a relatively rapid movement and then with a relatively slow movement, means for varying the amount of said relatively slow movement, means for adjustably and positively limiting said approaching movement, and means for separating said supports a definite period after said approaching movement has been limited.

25. Apparatus of the character described, comprising, in combination, a rotatable grinding element, means for rotating the grinding element, a sliding carriage upon which the grinding element is mounted, means for adjusting the position of the grinding element relatively to its carriage, a second carriage sliding transversely to the path of the said first carriage, connections between the said carriages such that the movement of the second carriage causes first a rapid and then a slow movement of the first carriage, means for driving said second carriage, means for supporting the work, means for rotating the work, and means for giving the work a vibrating movement relatively to said element.

26. Apparatus of the character described comprising, in combination, a wheel and means for rotating it, a sliding carriage supporting the wheel, means for adjusting the position of the wheel with respect to its carriage, a second carriage sliding transversely to the first one, connections between the carriages such that the second carriage moves the first, adjustments for said connections for varying the relative movements of the carriages, adjustable means for positively limiting the movement of the first carriage, a rotating cam for driving the second carriage, means for supporting the work, means for rotating the work, and means for giving the work a vibrating movement relative to the wheel.

27. Apparatus of the character described, comprising, in combination, a rotatable grinding element, a work support, automatic means for causing a positive and predetermined relative approaching movement between said element and the work, automatic means for causing a relative advancing movement between said element and the work, automatic means for causing a vibrating movement between said element and the work, and automatic means for causing a cessation of the grinding action on the work.

28. Apparatus of the character described, comprising, in combination, a support for a rotatable grinding element, a work support, means for effecting a predetermined relative positioning movement between said supports, and means for effecting a predetermined relative feeding movement between said supports.

29. Apparatus of the character described, comprising, in combination, a support for a rotatable grinding element, a work support, means for effecting a predetermined relative feeding movement between said supports, and means for separating said supports at a predetermined period after the feeding movement has ceased.

30. Apparatus of the character described, comprising, in combination, a support for a rotatable grinding element, a work support, means for effecting a predetermined relative positioning movement between said supports, means for effecting a predetermined relative feeding movement between said supports, and means for separating said supports at a predetermined period after the feeding movement has ceased.

31. Apparatus of the character described, comprising, in combination, a rotatable grinding element, means for supporting the work, automatic means for causing a relative positioning movement between said element and the work, automatic means for causing a positive and predetermined relative feeding movement between said element and the work, and automatic means for separating said element and the work.

32. Apparatus of the character described, comprising, in combination, a rotatable grinding element, a work support, and automatic means for bringing said element toward and into the work to grind the work to a predetermined dimension, for holding said element then at a fixed distance with relation to the work to complete the abrasion and for separating said element and the work when the abrasion has been completed.

33. Apparatus of the character described, comprising, in combination, a rotatable grinding element, a work support, and automatic means for bringing said element toward and into the work to grind the work to a predetermined dimension, for holding said element then at a fixed distance with relation to the work to complete the abrasion, for separating said element and the work when the abrasion has been completed, and for throwing off the driving means when said element and the work have been separated.

34. Apparatus of the character described, comprising, in combination, a wheel, means for supporting and rotating the work, means for effecting a positive and predetermined relative approaching movement between said wheel and the work, and means for effecting a relative vibrating movement between them, said vibrating movement being of such small amplitude that the grinding element remains continuously in contact with the work from the beginning to the end of the grinding operation.

35. Apparatus of the character described, comprising, in combination, a rotatable grinding element, means for supporting and rotating the work, means for effecting a relative approaching movement between said element and the work, and means for effecting a relative vibrating movement between said element and the work, said vibrating movement being of an amplitude predetermined independently of the dimensions of the work to be ground.

36. Apparatus of the character desc.ibed, comprising, in combination, a rotatable grinding element, means for supporting and rotating the work, means for effecting a positive and predetermined relative approaching movement between said element and the work, and means for effecting a relative vibrating movement between said element and the work, said vibrating movement being of an amplitude predetermined independently of the dimensions of the work to be ground.

37. Apparatus of the character described, comprising, in combination, a rotatable grinding element, means for supporting and rotating the work, automatic means for effecting a relative approaching movement between said element and the work, means for positively limiting the approaching movement, and automatic means for effecting a vibrating movement between said element and the work, said vibrating movement being of an amplitude predetermined independently of the dimensions of the work to be ground.

38. Apparatus of the character described, comprising, in combination, a rotatable grinding element, means for supporting and rotating the work, automatic means for effecting a relative approaching movement between said element and the work, means for effecting a relative vibrating movement between said element and the work, said vibrating movement being of an amplitude predetermined independently of the dimensions of the work, and automatic means for separating said element and the work at a definite period after the approaching movement has ceased.

39. Apparatus of the character described, comprising, in combination, a rotatable grinding element, means for supporting the work, automatic means for causing a relative positioning movement between said element and the work, automatic means for causing a relative feeding movement between said element and the work while said element and the work are in contact, automatic means for causing a vibrating movement between said element and the work, and automatic means for separating said element and the work.

40. Apparatus of the character described, comprising, in combination, a rotatable grinding element, means for supporting the work, automatic means for causing a relative positioning movement between said element and the work, and automatic means for causing a positive and predetermined relative feeding movement between said element and the work while said element and the work are in contact.

41. Apparatus of the character described, comprising, in combination, a rotatable grinding element, means for supporting the work, automatic means for causing a relative positioning movement between said element and the work, automatic means for causing a positive and predetermined relative feeding movement between said element and the work while said element and the work are in contact, and automatic means for separating said element and the work.

42. In a grinding machine, a grinding wheel, and means for rotating it; supports for the work, and means for rotating at least one of them so as to rotate the work; in combination with means for bringing together the wheel and the work to take a roughing cut; means for maintaining the two in fixed relative position for a determinate period to take a dimensioning cut, thereby compensating for spring in the machine or the work; and means for vibrating the work and the wheel relative to one another while the grinding is taking place.

43. Apparatus of the character described, comprising, in combination, a rotatable grinding element, a work support, automatic means for effecting a relative approaching movement between said element and the work, means for preventing the relative approaching movement beyond a predetermined relative position, automatic means for holding said element and said work at said predetermined relative position for a predetermined period upon the completion of the approaching movement, and automatic means for causing a vibrating movement between said element and the work.

44. An apparatus of the character described, comprising, in combination, a rotatable grinding element, means for supporting and rotating the work, automatic means for causing a continuous relative feeding movement between said element and the work, said means comprising a slidable carriage for one of said elements, a second carriage movable transversely to the first carriage and controlling the movement of the first carriage, automatic means for holding said element and said work at a fixed distance with relation to each other for a predetermined period on the completion of the feeding movement, and automatic means for causing a vibrating movement between said element and the work.

45. In a grinding machine, a grinding wheel, means for rotating it; supports for the work, and means for rotating the latter; in combination with means for bringing together the wheel and the work to take a roughing cut; means for then maintaining the two in fixed relative position for a determinate period to take a dimensioning cut, thereby compensating for spring; means for vibrating the work and wheel relative to one another during the grinding; and means for separating the wheel and the work when the dimensioning cut is complete.

In testimony whereof, I have signed my name to this specification, in the presence of two subscribing witnesses.

FRIEDERICH MÜLLER.

Witnesses:
W. N. Storrs,
W. J. Petsch.

Corrections in reissue Letters Patent No. 13,930.

Copies of this patent may be obtained for five cents each, by addressing the "Commissioner of Patents, Washington, D. C."

It is hereby certified that in reissue Letters Patent No. 13,930, granted June 15, 1915, upon the application of Friederich Müller, of Hartford, Connecticut, for an improvement in "Grinding-Machines," errors appear in the printed specification requiring correction as follows: Page 1, line 26, for the word "of" read *or*; same page, lines 86–87 strike out the words and period "in said movement. In the said illustrated"; same page, line 86, after the word "work" insert a period, and line 87, commence the word "means" with a capital, thus making a new sentence; and that the said Letters Patent should be read with these corrections therein that the same may conform to the record of the case in the Patent Office.

Signed and sealed this 6th day of July, A. D., 1915.

[SEAL.]

R. F. WHITEHEAD,

*Acting Commissioner of Patents.*